Dec. 15, 1925.

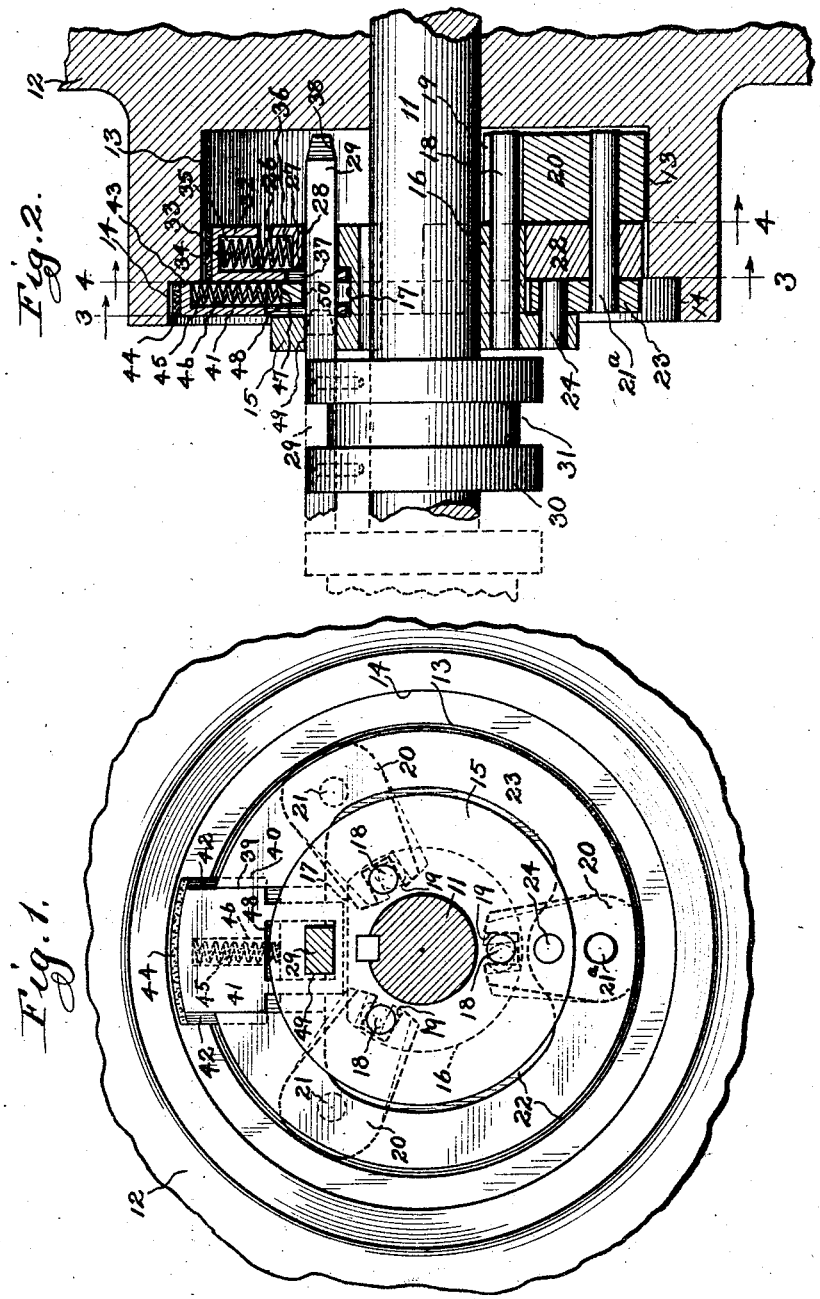

W. L. LINDGREN

CLUTCH

Filed Jan. 18, 1924

Witness:
Richard J. Jacker

Inventor:
Waldemar L. Lindgren
By John Howard McElroy
his Atty.

Patented Dec. 15, 1925.

1,565,377

UNITED STATES PATENT OFFICE.

WALDEMAR L. LINDGREN, OF CHICAGO, ILLINOIS, ASSIGNOR, BY DIRECT AND MESNE ASSIGNMENTS, TO ALFRED A. NORTON, TRUSTEE, OF CHICAGO, ILLINOIS.

CLUTCH.

Application filed January 18, 1924. Serial No. 686,948.

*To all whom it may concern:*

Be it known that I, WALDEMAR L. LINDGREN, a citizen of the United States, and a resident of Chicago, in the county of Cook and State of Illinois, have invented certain new and useful Improvements in Clutches, of which the following is a specification.

My invention is concerned with clutches of the type shown in my Patent No. 1,472,480, issued October 30, 1923, and is designed to furnish a more powerful means for disengaging the clutch dogs than is shown in the aforesaid patent, all as will be hereinafter fully described and the novel features thereof pointed out in the claims.

To illustrate my invention, I annex hereto two sheets of drawings, in which the same reference characters are used in all the figures, of which—

Figure 1 is a side elevation of a clutch embodying my invention;

Fig. 2 is a central vertical section; and

Figure 4:
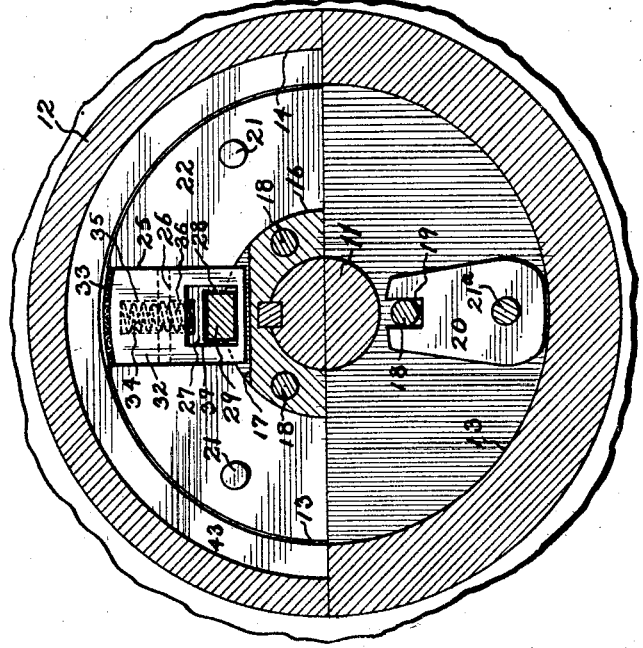
Figure 3:
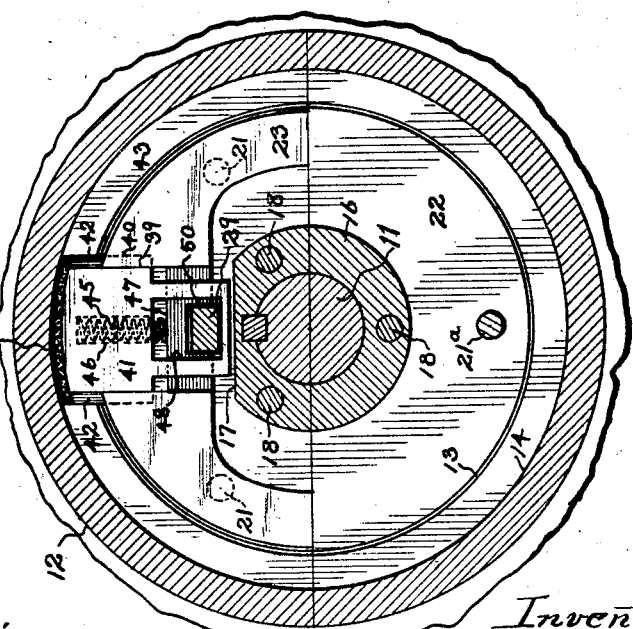

Figs. 3 and 4 are vertical sections on the lines 3—3 and 4—4, respectively, of Fig. 2.

In illustrating my clutch invention, I have shown it as applied between a driving member, such as the shaft 11, and a driven member, such as a belt pulley 12, suitably mounted to rotate on or adjacent to said shaft 11, and having the main circular recess 13 therein, and outside of this, the supplementary annular recess 14. The shaft 11 has splined or otherwise rigidly secured thereon, the short sleeve or collar 15, having its outer end of a considerably greater diameter than its inner end 16, the two ends being connected by the annular, vertical, plane surface and the portion 16 being flattened at 17 to accommodate elements to be hereinafter described. The collar 15 has secured thereon preferably three, preferably equidistant, pins 18, which extend horizontally inward nearly to the bottom of the recess 13, and into the recesses 19 formed in the power ends of the corresponding clutch levers or dogs 20 which are fulcrumed on the pins 21 and 21ª secured in the ring 22 which fits loosely in the outer portion of the recess 13, and is journaled, as it were, on the reduced inner end 16 of the collar 15. The outer end of the pin 21ª, which is longer than the pins 21, extends into the lever ring 23, which is of the shape outlined in Fig. 1, and is fulcrumed on the pin 24 projecting inwardly from the face of the collar 15.

As in my prior Patent No. 1,472,480, the ring 22 has a radial channel 25 cut therein and extending entirely through it at its outer end inwardly to the point 26, and only in to the surface 27 at its inner end, except for the rectangular recess 28 in its inner periphery, which recess extends entirely through it to accommodate the clutch-shifting bar 29 secured in the collar 30 having the annular groove 31 therein to receive the customary ring (not shown) connected with the customary shipper lever (not shown). Sliding radially in the channel 25 is a plunger 32 having secured on its outer end the leather brake 33 adapted to contact with the periphery of the recess 13 when the helically-coiled, expanding spring 34 is free to force it outward to that extent. This spring is located in the housing formed for its outer end by the recess 35 in the plunger 32 and for its inner end by the registering recess 36 in the ring 22. The thinner, inner end of the plunger 32 has an aperture 37 therein to accommodate the bar 29, the outer end 38 of which is tapered so as to enter the recess 28 when the ring 22 is displaced as it is when the clutch is operative.

The lever ring 23 has a similar radial channel 39 with its edges undercut at 40 so as to prevent the spring-pressed plunger 41 with its beveled flanges 42 at its edges from being displaced laterally outward, it being held from inward displacement by its contact with the annular surface 43 between the recesses 13 and 14. The plunger has the leather brake 44 on its end adapted to contact with the periphery of the recess 14 under the thrust of the helically-coiled, expanding spring 45, when the bar 29 is withdrawn to its dotted-line position of Fig. 2, said spring 45 being located in the channel 46 formed in the rear face of the plunger 41 and having its inner end resting in the recess 47 formed in the uncut-away portion of the bottom of the channel in the ring 23. The plunger 41 has a rectangular aperture 48 formed therein to accommodate the bar 29, which when it is pushed in, as shown in full lines, by its beveled end 38 engaging the bottom of the apertures 37 and 48, pulls both of the plungers 32 and 41 inwardly so that their brakes 33 and 44 are out of engagement with the peripheries of the recesses 13 and 14, respectively. The bar 29 fits snugly in the rectangular aperture 49 in the collar 15 through which it slides, and when it is shoved in, its sides engage the sides of the recess 50 in the straight-line portion of the inner periphery of the lever ring 23, as well as the sides of the recess 28 in the inner periphery of the ring 22, so that with the bar 29 in the full-line position of Fig. 2, the locking levers 20 are all held in their radial position shown in Fig. 1, in which position the outer ends of the levers 20, curved on the arc of a circle with the center of the shaft 11 as a center, are held out of engagement with the periphery of the recess 13.

The operation of my improved clutch mechanism is as follows:

With the parts in the position shown in Figs. 1 and 2, both the breaks and all of the clutch dogs or levers 20 are held inactive, and the rotation of the shaft 11 can deliver no power to the belt wheel 12, and if there is any substantial resistance to its rotation with the shaft 11 on which it is journaled, it will remain at rest. If now it is desired to clutch the wheel 12 to the shaft 11, the bar 29 is moved by the shipper lever (not shown) to the dotted-line position of Fig. 2. As soon as the plungers 32 and 41 are released from the bar 29, they fly outward under the thrust of their springs 34 and 45, bringing the brakes 33 and 44 into engagement with the peripheries of the recesses 13 and 14. This tends to slow up the movement of the rings 22 and 23 relative to the collar 15, with the result that the collar 15 rotates ahead of the ring 22 and lever ring 23 a little, and as a consequence the pins 18 acting on the notches 19 swing the clutch dogs or levers 20 to the dotted-line position of Fig. 1, which position is somewhat exaggerated, and as the ends of the dogs 20 are eccentric to the pins 21 and 21ª on which they are mounted, they are jammed against the periphery of the recess 13, thereby clutching the shaft 11 to the belt pulley 12, and it will be noted that this clutching action takes place irrespective of the direction of rotation of the shaft 11, and that the greater the load, the more securely it is clutched to the driving shaft. When it is desired to unclutch the parts, the bar 29 is shoved in, withdrawing the brakes 33 and 44 through its beveled end engaging the inner edges of the apertures 48 and 37, and centering the rings 23 and 22 by reason of the engagement of its sides with the edges of the recesses 50 and 28 in the rings 23 and 22, respectively. When the beveled end 38 of the bar 29 is engaging the side of the recess 50 that is displaced away from the bar 29, it causes the ring 23 to act as a lever to rotate the ring 22 back to its neutral position, to which it tends immediately thereafter to be forced by the engagement of the beveled end 38 of the bar 29 with the side of the notch 28 which has been displaced away from the central line of the bar. This lever action is as follows: The power is applied by the beveled end 38 of the bar 29 to the side of the notch 50, swinging the ring 23 slightly on the pin 24 as a fulcrum. The pin 21ª in the load end of the lever ring swings and transmits the power to the ring 22 and the dogs 20, causing the latter to assume their radial position while the pins 18 remain relatively stationary, and also carrying the ring 22 to its neutral position, anticipating and assisting, as it were, the action of the beveled end 38 of the bar 29 on the recess 28 in the ring 22. This increased application of the power delivered by the sliding of the bar 29 to the ring 22 enables me to get a quick release of the clutch irrespective of how heavy it is, or how great the load, and constitutes a valuable improvement, especially for heavy clutches and heavy duty, over the structure shown in my aforesaid Patent No. 1,472,480.

While I have shown and described my invention as embodied in the form which I at present consider best adapted to carry out its purposes, it will be understood that it is capable of modifications, and that I do not desire to be limited in the interpretation of the following claims except as may be necessitated by the state of the prior art.

What I claim as new, and desire to secure by Letters Patent of the United States, is:

1. In a clutch, the combination with a rotatable driving member, of an annular driven member concentric therewith, a ring interposed between the two members, a plurality of clutch dogs pivoted on the ring and having their clutching ends adapted to engage the inner periphery of the driven member when swung out from neutral position, means carried by the driving member adapted to swing the clutch dogs to clutching position when the driving member is rotated, and means for swinging the dogs to unclutching position without stopping the driving member, said unclutching means including a lever member for multiplying the power applied for said purpose.

2. In a clutch, the combination with a rotatable driving member, of an annular driven member concentric therewith, a ring interposed between the two members, a plurality of clutch dogs pivoted on the ring and having their clutching ends adapted to engage the inner periphery of the driven member when swung out from neutral position, means carried by the driving member adapted to swing the clutch dogs to clutching position when the driving member is rotated, registering grooves in the driving member and the ring, a tapered member adapted to co-operate with said grooves, means for sliding the tapered member in and out to force said grooves into registration or to permit their relative displacement, and a lever member fulcrumed on the driving member and connected to the ring, said lever member having a surface adapted to be engaged by the tapered member when it is moved to force the grooves into registration.

3. In a clutch, the combination with a rotatable driving member, of an annular driven member concentric therewith, a ring interposed between the two members, a plurality of clutch dogs pivoted on the ring and having their clutching ends adapted to engage the inner periphery of the driven member when swung out from neutral position, means carried by the driving member adapted to swing the clutch dogs to clutching position when the driving member is rotated, registering grooves in the driving member and the ring, a tapered member adapted to co-operate with said grooves, means for sliding the tapered member in and out to force said grooves into registration or to permit their relative displacement, and a lever ring concentric with the first mentioned ring fulcrumed on the driving member and connected to said first mentioned ring, said lever ring having a groove registering with the other grooves when the parts are unclutched and the tapered member is shoved in.

4. In a clutch, the combination with a rotatable driving member, of an annular driven member concentric therewith, a ring interposed between the two members, a plurality of clutch dogs pivoted on the ring and having their clutching ends adapted to engage the inner periphery of the driven member when swung out from neutral position, means carried by the driving member adapted to swing the clutch dogs to clutching position when the driving member is rotated, and means for swinging the dogs to unclutching position without stopping the driving member, said unclutching means including a lever member fulcrumed on the driving member for multiplying the power applied.

5. In a clutch, the combination with a rotatable driving member, of an annular driven member concentric therewith, a ring interposed between the two members, a plurality of clutch dogs pivoted on the ring and having their clutching ends adapted to engage the inner periphery of the driven member when swung out from neutral position, means carried by the driving member adapted to swing the clutch dogs to clutching position when the driving member is rotated relative to the ring, means operating automatically to slow up the movement of the ring relative to the driving member to cause clutching action, and supplemental means for swinging the clutch dogs to unclutching position and for slowing up the movement of the ring.

6. In a clutch, the combination with a rotatable driving member, of an annular driven member concentric therewith, a ring interposed between the two members, a plurality of clutch dogs pivoted on the ring and having their clutching ends adapted to engage the inner periphery of the driven member when swung out from neutral position, means carried by the driving member adapted to swing the clutch dogs to clutching position when the driving member is rotated relative to the ring, means operating automatically to slow up the movement of the ring relative to the driving member to cause clutching action, and supplemental means for swinging the clutch dogs to unclutching position and for slowing up the movement of the ring, said supplemental means consisting of a lever ring fulcrumed on the driving member and connected to the first mentioned ring, and actuated in advance of the actuation of said first mentioned ring, and a spring-pressed brake shoe carried by the lever ring and withdrawn when the driving and driven members are unclutched.

In witness whereof, I have hereunto set may hand this 11th day of January, 1924.

WALDEMAR L. LINDGREN.